United States Patent [19]

Draney

[11] 4,062,588

[45] Dec. 13, 1977

[54] SWIVEL SEAT ASSEMBLY

[75] Inventor: Robert Gene Draney, Wichita, Kans.

[73] Assignee: J. I. Case Company, Racine, Wis.

[21] Appl. No.: 671,283

[22] Filed: Mar. 29, 1976

[51] Int. Cl.² ............... A62B 35/00; F16M 13/00
[52] U.S. Cl. .................................. 297/385; 248/415; 297/349
[58] Field of Search .............. 297/349, 385, 216; 248/418, 415; 108/139; 403/164, 165, 78

[56] References Cited

U.S. PATENT DOCUMENTS

| | | | |
|---|---|---|---|
| 1,326,943 | 1/1920 | McManis | 297/385 |
| 1,634,922 | 7/1927 | Stubblebine et al. | 248/418 |
| 2,560,659 | 7/1951 | Payeur | 108/139 |
| 3,278,229 | 10/1966 | Bates | 297/349 |
| 3,338,622 | 8/1967 | Bachmann | 297/349 X |
| 3,508,733 | 4/1970 | Skeel | 248/415 |
| 3,910,633 | 10/1975 | Marsh | 297/349 |

Primary Examiner—James T. McCall
Attorney, Agent, or Firm—Arthur J. Hansmann

[57] ABSTRACT

A swivel seat assembly including a seat portion and a pedestal, and male and female members interconnected between the seat portion and this pedestal for permitting 360° swiveling of the seat and preventing the seat portion from moving off the pedestal, particularly when the occupant is on the seat portion and has a belt attached.

2 Claims, 5 Drawing Figures

U.S. Patent
Dec. 13, 1977
4,062,588
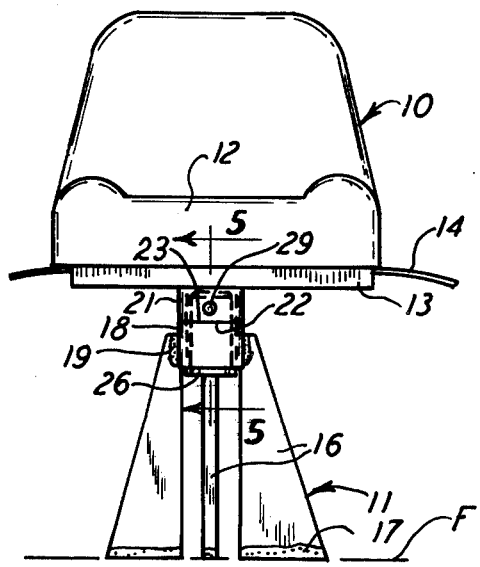
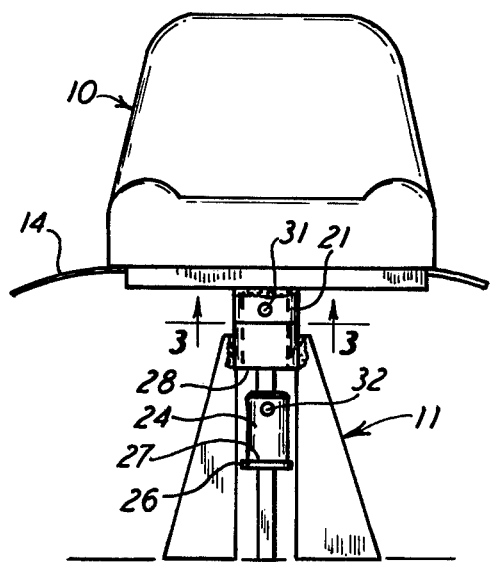
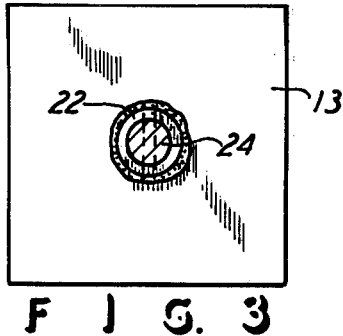

SWIVEL SEAT ASSEMBLY

This invention relates to a swivel seat assembly, and, more particularly, it relates to a swivel seat assembly for use upon a vehicle such as a tractor having seat belts thereon.

BACKGROUND OF THE INVENTION

The prior art is aware of various constructions for seat assemblies of the type which can be swiveled the full 360°. Also, the prior art includes disclosures of seat assemblies wherein the seat portion itself is axially affixed with a pedestal or the like to thereby preclude removal of the seat portion from the pedestal.

The present invention provides a swivel seat assembly wherein the seat can swivel the full 360° and the seat portion has seat belts affixed thereto for holding the occupant to the seat, and the entire assembly is arranged so that the occupant will be held to the seat in the event the tractor or like vehicle on which the seat is mounted is tipped. That is, the occupant will not fall from the seat even though the seat itself is tipped, and thus the present invention provides a swivel type of seat assembly particularly useful for tractors of the like which are commonly subjected to tipping or rolling over.

Still further, the present invention provides a swivel seat assembly which accomplishes the aforementioned and which provides a construction sturdy and reliable but yet simplified in the various elements required in the construction, and the assembly permits the full 360° swiveling of the seat portion relative to a fixed pedestal, and yet the seat portion and pedestal can be readily and easily assembled and disassembled relative to each other. Accordingly, in accomplishing the aforementioned, the assembly has interconnecting male and female type members which serve the several purposes of providing the full swivel action for the seat and for aligning the fixed pedestal and the seat portion and retaining them aligned and for securing the seat portion and pedestal together so that the entire assembly becomes a safety type assembly.

Other objects and advantages will become apparent upon reading the following description in light of the accompanying drawings.

BRIEF DESCRIPTION OF THE DRAWINGS

FIG. 1 is a front elevational view of the seat assembly of this invention.

FIG. 2 is a front elevational view of the assembly of FIG. 1, but showing one connecting part in a disconnected position.

FIG. 3 is a sectional view taken along the line 3—3 of FIG. 2.

FIG. 4 is a bottom plan view of the pedestal portion of the assembly shown in FIGS. 1 and 2.

FIG. 5 is a sectional view taken long the line 5—5 of FIG. 1.

DETAILED DESCRIPTION OF THE PREFERRED EMBODIMENT

FIG. 1 shows the safety seat assembly of this invention which includes the seating portion generally designated 10 and the pedestal portion generally designated 11. The portion 10 includes the seat cushion 12 and the support plate or member 13 disposed underneath the cushion 12 and being suitably affixed thereto, in any conventional arrangement. Also, FIGS. 1 and 2 show fragments of seat belts or straps 14 which are suitably affixed to the seating portion 10 and which would extend longer than that shown and would normally extend across the lap of the person on the seat cushion 12, in the usual and well-known manner.

The pedestal 11 is arranged to be suitably affixed to a floor designated F, and that may be the floor of a vehicle such as a tractor which is not otherwise shown. Thus, the pedestal 11 is shown to have several upstanding pieces 16 which may be affixed to the floor by the welding 17 or may be bolted thereto, and thus the pedestal 11 is affixed to the vehicle and extends above the floor F and has a tubular piece 18 at the upper end of the members 16, with the piece 18 being affixed to the members 16 by means of the weldments 19.

The seating portion 10 and the pedestal 11 have interengaged male and female members, such as shown in the drawings. The seating portion 10 has a tubular or cylindrical member 21 extending therebelow and terminating in a circular surface 22, and the surface 22 is in alignment with the circular surface 23 which is the upper edge of the pedestal piece 18. Thus the surfaces 22 and 23 are of the same annulus and diameters, and they are bearing surfaces in contact and in abutment with each other and the surfaces 22 and 23 are sufficiently smooth or finished so that the member 21 can rotate relative to the member 18 when the weight of a person is on the seat portion 10 which is swiveling up to the full 360° permitted by the assembly shown and described herein. Thus, the members 18 and 21 are both tubular pieces of the same inner and outer diameters, and they are in abutment, as shown and described. Finally, a pivot pin or interengaging member 24, of a cylindrical shape as seen in FIG. 2, is disposed inside the tubular members 18 and 21 to extend therebetween and across the juncture defined by the bearing surfaces 22 and 23, as seen in FIG. 1. The cylindrical piece 24 is therefore of a diameter to be snugly disposed within the pieces 18 and 21, and thus the diameter of the piece 24 is substantially the same as the internal diameter of the pieces 18 and 21 so that the piece 24 is snugly disposed within the pieces 18 and 21 to axially align the pieces 18 and 21 and avoid any offset between those pieces 18 and 21 and to thereby guide them while permitting the full 360 degree swiveling of the seat portion, as mentioned.

Further, the piece 24 is arranged with a circular flange or head 26 extending completely around the lower end thereof, and the flange 26 has an upper surface 27 which abuts the lower surface 28 of the piece 18, and the surfaces 27 and 28 rotate relative to each other and are therefore sufficiently finished so that only a minimal of friction would exist therebetween during the swiveling action of the seat portion 10. A lock pin 29 passes through an opening 31 in the piece 21 and through an opening 32 in the pin 24, and thus the lock pin 29 secures the pin 24 upwardly in the two pieces 18 and 21, as shown in FIGS. 1 and 5. FIG. 2 of course shows the pin 24 in the lowered and disassembled position, and it would of course be understood that the pin 24 would be disposed between the standards or legs 16 of the pedestal 11 prior to bolting or otherwise securing the pedestal 11 to the floor F.

The arrangement is such that the distance between the flange surface 27 and the pinhole 32 is only substantially the same as the distance between the surface 28 and the pinhole 31, and thus there is a snug fitting of the seating portion 10 on the pedestal 11 relative to the axial direction of the tubular members 18 and 21 and therefore the seating portion will not move away from its secure and firm position on the pedestal 11.

In addition to providing a stable and secure 360° swivel seat, as described above, the seat assembly is of a safety arrangement in that the pin 24 will prevent the seating portion 10 from moving away from the pedestal 11, even in the event that the tractor-like vehicle accidently rolls over. Therefore, the occupant utilizing the seat belts 14 will remain on the upturned seat and will not be injured. Further, the entire assembly is fully utilitarian, as mentioned above, and it is comprised of only a minimum of parts which are sturdy and will assure that the seat remains sufficiently firm and aligned so that there will be no rocking of the seat but yet it permits the full swiveling and the safety features mentioned. Also, the construction shown and described herein thus has the arrangement of the flanged ahead 26 and the locking pin 29 which serve as stops to preclude axial separation for movement of the pieces 18 and 21 away from each other and relative to the pivot pin 24. Also, the head 26 on the pin 24 is thus disposed and secured upwardly against the surface 28 and is positioned and available to resist rocking of the seating portion 10 relative to the pedestal 11, and thus a stable and secure assembly is presented, as well as the safety assembly described herein.

What is claimed is

1. A swivel seat assembly for use in a tractor having a floor comprising a seating portion for supporting a person, seat belts attached to said seating portion for holding a person onto said seating portion, a seat pedestal affixable to said floor, a tubular member attached to each of said seating portion and said pedestal and having the same internal diameter and being vertically co-axially disposed and having matching annular surfaces of the same diameter in end-to-end rotational contact with each other for full-circle rotating of said seating portion about the common axis and relative to said pedestal, a cylindrical pin of the diameter of said tubular members and snugly disposed within and extending between said tubular members for axially aligning said members together and thereby prevent eccentric relative movement of said tubular members, and stops operative between said pin and both of said tubular members and extending radially of said tubular members and beyond the inner diameters thereof for maintaining said tubular members in end-to-end rotational contact and for securing said tubular members against relative tipping, said pin extending below the lower end of the lower one of said tubular members, a head on said pin and overlapping and engaged with the lower surface of said lower tubular member to present the one of said stops operative between said pin and said lower tubular member, and a removable pin extending radially between the upper one of said tubular members and said cylindrical pin to present the one of said stops operative between said pin and said upper tubular member.

2. A swivel seat assembly for use in a tractor comprising a tractor floor, a seating portion for supporting a person and including a tubular member extending therebelow and terminating in a open lower end, seat belt attached to said seating portion for holding a person onto said seating portion, a seat pedestal affixed to said floor and including a tubular member disposed below and in end-to-end contact with said seating portion tubular member and axially aligned therewith, said tubular members being co-axially and uprightly disposed and of the same inner diameters and having annular bearing surfaces at the contacting ends thereof for rotation of said seating portion tubular member on said pedestal tubular member, a cylindrical pivot pin of the diameter of said tubular members and extending snugly within and between said tubular members for maintaining said tubular members axially aligned, a rotation bearing surface on the lower end of said pedestal tubular member, said pin including a head disposed below and overlapping the lower end said bearing surface and thereby presenting an axial stop operative on said pedestal tubular member, and a pin radially extending between said seating portion tubular member and said pivot pin and thereby presenting an axial stop operative on said seating portion tubular member, to prevent relative tipping of said portions.

* * * * *